US008212865B2

(12) United States Patent　(10) Patent No.: US 8,212,865 B2
Fujiyoshi　(45) Date of Patent: Jul. 3, 2012

(54) MICROSCOPE IMAGE PICKUP APPARATUS, MICROSCOPE IMAGE PICKUP PROGRAM PRODUCT, MICROSCOPE IMAGE PICKUP PROGRAM TRANSMISSION MEDIUM AND MICROSCOPE IMAGE PICKUP METHOD

(75) Inventor: Kouji Fujiyoshi, Tokyo (JP)

(73) Assignee: Olympus Corporation, Tokyo (JP)

( * ) Notice: Subject to any disclaimer, the term of this patent is extended or adjusted under 35 U.S.C. 154(b) by 1243 days.

(21) Appl. No.: 11/999,585

(22) Filed: Dec. 6, 2007

(65) Prior Publication Data

US 2008/0140317 A1　Jun. 12, 2008

(30) Foreign Application Priority Data

Dec. 8, 2006　(JP) ................................. 2006-331573

(51) Int. Cl.
*H04N 7/18*　(2006.01)
*H04N 9/47*　(2006.01)
*G01J 1/20*　(2006.01)
*G02B 21/36*　(2006.01)

(52) U.S. Cl. ........................ 348/79; 250/201.3; 359/369

(58) Field of Classification Search .............. 348/79–80; 359/368–369; 250/201.3
See application file for complete search history.

(56) References Cited

U.S. PATENT DOCUMENTS

| 5,101,277 | A | * | 3/1992 | Kanata | 348/349 |
| 5,430,483 | A | * | 7/1995 | Haruki | 348/349 |
| 5,557,097 | A | * | 9/1996 | Ortyn et al. | 250/201.3 |
| 5,604,537 | A | * | 2/1997 | Yamazaki et al. | 348/350 |
| 5,621,822 | A | * | 4/1997 | Yukawa et al. | 382/255 |
| 5,675,141 | A | * | 10/1997 | Kukihara | 250/201.3 |
| 5,912,699 | A | * | 6/1999 | Hayenga et al. | 348/132 |
| 6,407,768 | B1 | * | 6/2002 | Ishikawa | 348/79 |
| 6,567,097 | B1 | * | 5/2003 | Iwaki | 345/603 |
| 7,102,815 | B2 | * | 9/2006 | Ishii | 359/363 |
| 7,133,078 | B2 | * | 11/2006 | Nagasawa | 348/353 |

FOREIGN PATENT DOCUMENTS

| JP | 8-334520 A | 12/1996 |
| JP | 9-135390 A | 5/1997 |
| JP | 10-048512 A | 2/1998 |

(Continued)

OTHER PUBLICATIONS

Japanese Office Action dated Mar. 29, 2011 (and English translation thereof) in counterpart Japanese Application No. 2006-331573.

*Primary Examiner* — George C Neurauter

(74) *Attorney, Agent, or Firm* — Holtz, Holtz, Goodman & Chick, PC

(57) ABSTRACT

This is a microscope image pickup apparatus for shooting and forming the observation images of a specimen in order to observe it by a microscope. The microscope image pickup apparatus comprises an image pickup unit for shooting and forming the observation images, a display unit for dynamically displaying the observation images shot and formed by the image pickup unit in succession and an operating state detection unit for detecting an operating state of a microscope operation part in order to operate the microscope on the basis of the change of the observation images dynamically displayed on the display unit. The present invention provides a microscope image pickup apparatus, a microscope image pickup program product, a microscope image pickup program transmission medium and a microscope image pickup method which are capable of displaying an optimum moving image according to the operating state of the microscope.

19 Claims, 14 Drawing Sheets

FOREIGN PATENT DOCUMENTS

| | | |
|---|---|---|
| JP | 2000-324400 A | 11/2000 |
| JP | 2001-091845 A | 4/2001 |
| JP | 2001-109422 A | 4/2001 |
| JP | 2001-148804 A | 5/2001 |
| JP | 2001-154114 A | 6/2001 |
| JP | 2001-292369 A | 10/2001 |
| JP | 2003-008982 A | 1/2003 |
| JP | 2004-128582 A | 4/2004 |
| JP | 2005-037683 A | 2/2005 |
| JP | 2005-184641 A | 7/2005 |
| JP | 2005-221708 A | 8/2005 |
| JP | 2006-145793 A | 6/2006 |

* cited by examiner

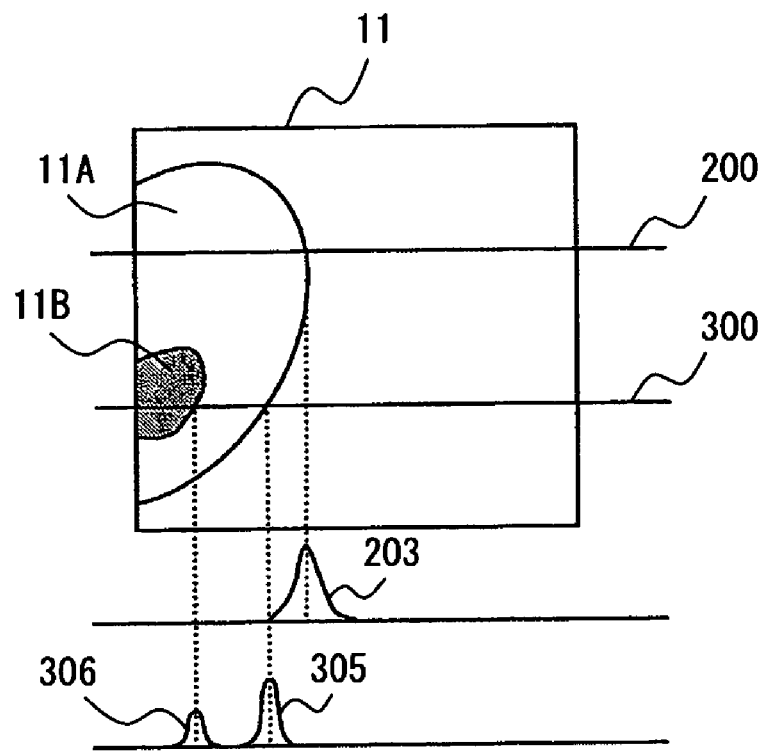
F I G. 4

|   | 1 | 2 | 3 | 4 | 5 | 6 | 7 | 8 | | |
|---|---|---|---|---|---|---|---|---|---|---|
| 1 | R | G | R | G | R | G | R | G | | |
| 2 | G | B | G | B | G | B | G | B | | |
| 3 | R | G | R | G | R | G | R | G | | |

$Y(1,1) = (Ir(1,1) + Ig(2,1) + Ig(1,2) + Ib(2,2))/4$

F I G. 7

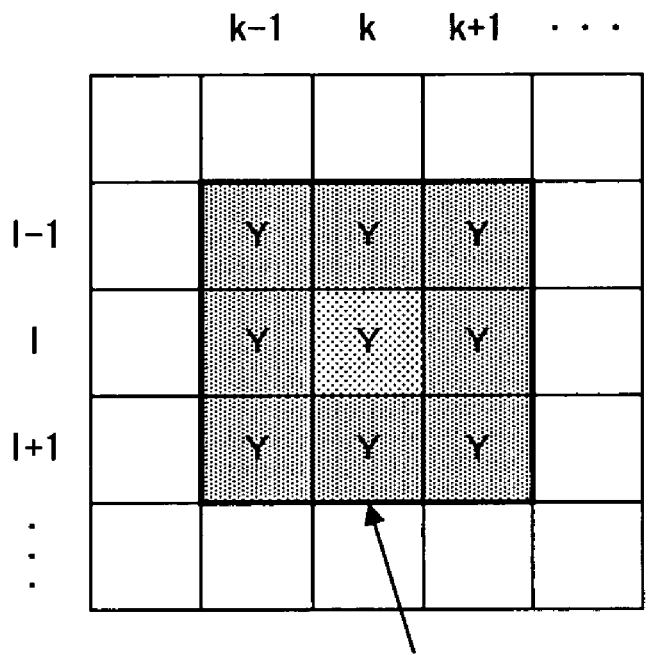
$Y(k-1, l-1)+Y(k, l-1)+Y(k+1, l-1)+Y(k-1, l)+Y(k+1, l)+$
$Y(k-1, l+1)+Y(k, l+1)+Y(k+1, l+1)-8*Y(k, l)$
F I G. 8

| MEMORY ADDRESS | PEAK POSITION (MAXIMUM POINT) | PEAK STRENGTH (MAXIMUM VALUE) |
|---|---|---|
| 1 | $(kmax1, lmax1)$ | $Fmax1$ |
| 2 | $(kmax2, lmax2)$ | $Fmax2$ |
| 3 | $(kmax3, lmax3)$ | $Fmax3$ |
| 4 | $(kmax4, lmax4)$ | $Fmax4$ |
| . | . | . |
| . | . | . |
| . | . | . |
| q | $(kmaxq, lmaxq)$ | $Fmaxq$ |

F I G. 9

MICROSCOPE IMAGE PICKUP APPARATUS, MICROSCOPE IMAGE PICKUP PROGRAM PRODUCT, MICROSCOPE IMAGE PICKUP PROGRAM TRANSMISSION MEDIUM AND MICROSCOPE IMAGE PICKUP METHOD

CROSS REFERENCE TO RELATED APPLICATIONS

This application is based upon and claims the benefit of priority from the prior Japanese Patent Application No. 2006-331573, filed on Dec. 8, 2006, the entire contents of which are incorporated herein by reference.

BACKGROUND OF THE INVENTION

1. Field of the Invention

The present invention relates to a microscope image pickup apparatus for shooting and forming images observed by a microscope, its microscope image pickup program product, its microscope image pickup program transmission medium and its microscope image pickup method, and more particularly to a microscope image pickup apparatus capable of switching an observed image reading method on the basis of the change of the observed image whose moving image is displayed, its microscope image pickup program product, its microscope image pickup program transmission medium and its microscope image pickup method.

2. Description of the Related Art

Traditionally, image pickup devices, such as a digital still camera, an electronic camera and the like, provided with a storage media for recording the image data, such as digital data and the like, of the observed image of a subject which is formed by an image pickup optical system, such as an image pickup lens and the like, and the numeric value of the brightness of the image using a solid image pickup device composed of a charge coupled device (CCD), are widely spread.

Many such devices are connected and used to microscopes in order to shoot and record a microscope state, such as tissue from a living body, a cell and the like, besides generally shooting and forming scenery, persons and the like. An image pickup apparatus for shooting and forming an image observed by a microscope (microscope image pickup apparatus) has a moving image display function to search for the body part to be observed of a specimen placed on a stage (specimen table) of the microscope, determine its image angle and focus it before shooting, and displays the moving image on a monitor screen.

In the microscope image pickup apparatus, there is an operation called "framing" to horizontally shift a specimen surface against an optical axis (in XY direction), such as to horizontally shift the stage, to shift a stage clip for fixing a glass slice and the like, when searching for a body part to be observed of a specimen and fixing its image angle while displaying its moving image (A). In it there is also an operation called "focusing" to appropriately locate a specimen by operating its specimen surface against the optical axis, such as to vertically shift the stage (in Z direction), to vertically shift an object lens (in Z direction) and the like, when focusing it. As described above, an operator can determine an appropriate operating state of a microscope operation part while displaying its moving image.

However, a recent solid image pickup device has the slow update time of a displayed moving image due to the long reading time of a multiple pixel. Therefore, when framing it, images are difficult to see because of bright emission, dark change, blur and the like due to the sudden change of an observed image, which is a problem. In a microscope image pickup apparatus having an interlace scanning image pickup device, displacement occurs in image output data (color displacement in the case of a color CCD) when framing since observation places are different for each field when reading odd lines and even lines, which is a problem.

For example, Japanese Patent Application Publication No. 2001-148804 discloses a technology for separating when observing a moving image from when shooting a still image and switching over to a high-speed reading mode which is limited to a partial pixel when observing a moving image although it records an observed image by all-pixel reading mode when shooting a still image. Such a technology can suppress image blur when horizontally shifting the stage and also the color displacement of the interlace scanning in order to solve these problems.

For example, Japanese Patent Application Publication No. 2001-292369 also discloses a technology for detecting the driving state of the drive unit of the microscope of a microscope system capable of electrically driving and controlling the stage (motorized microscope), and selecting a high-speed reading mode and an all-pixel reading mode when shifting the stage and when stopping the stage, respectively.

SUMMARY OF THE INVENTION

According to one aspect of the present invention, the microscope image pickup apparatus of the present invention shoots the observed image of a specimen in order to observe the specimen by a microscope. The microscope image pickup apparatus comprises an image pickup unit for shooting and forming the observed images, a display unit for displaying the observed images shot and formed by the image pickup unit as a series of moving images and an operating state detection unit for detecting the operating state of the microscope operation part on the basis of the change of the observed images displayed as moving images in the display unit in order to operate the microscope.

BRIEF DESCRIPTION OF THE DRAWINGS

The present invention will be more apparent from the following detailed description when the accompanying drawings are referenced;

FIG. 4 shows an image display example (a state after framing) in the first preferred embodiment of the present invention;

FIG. 7 shows the operation image of a brightness generation unit 600;

FIG. 8 shows the operation image of a Laplacian operation unit 601;

FIG. 9 shows a data string stored in table memory 602A;

DESCRIPTION OF THE PREFERRED EMBODIMENTS

The preferred embodiments of the present invention are described below in reference with the drawings.

Figure 1:
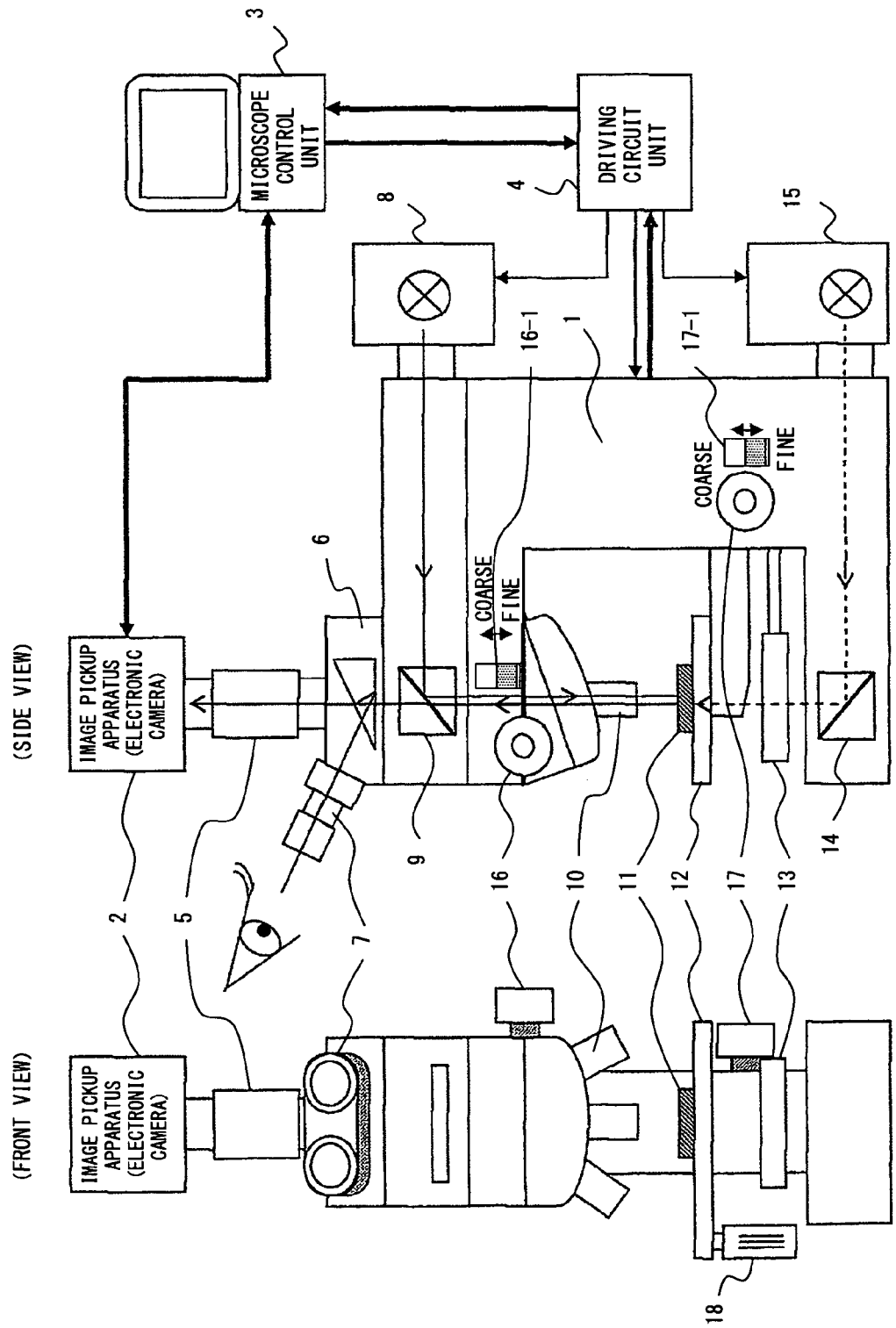
FIG. 1 shows the configuration of the microscope system in the preferred embodiment of the present invention.

FIG. 1 shows the configuration of the microscope system in the preferred embodiment of the present invention.

In FIG. 1, an object lens 10 opposing a specimen 11 on a stage (specimen table) 12 is disposed in a microscope main body 1. An eyepiece lens unit 7 is disposed on the observation optical axis through this object lens 10, through an observation tube unit 6. An image pickup apparatus 2, such as an electronic camera and the like, is disposed through an image pickup lens unit 5.

A microscope control unit 3 adjusts the strength of light of a transparent illumination light source 15 and scattering illumination light source 8 according to the instruction of a system controller 110 (see FIG. 2) of a CPU for determining the shooting condition and the like of the image pickup apparatus 2 and also issues control instructions to a driving circuit unit 4. The position of a specimen 11 is adjusted by a stage XY handle 18 and stage Z-axis handle 17. The focus of the specimen 11 is sometimes adjusted by an object lens Z-axis handle 16. Although FIG. 1 shows an upright microscope, many of the object lens Z-axis handle 16 are installed in an inverted microscope. Some driving circuit unit 4 automatically controls the position of a stage 12, the selection or position of the object lens 10 and the selection of a fluorescent cube unit 9.

An object lens Z-axis handle coarse/fine-operation change-over switch 16-1 and a stage Z-axis handle coarse/fine-operation change-over switch 17-1, for switching coarse-operation and fine-operations are installed in the object lens Z-axis handle 16 and the stage Z-axis handle 17, respectively.

Figure 2:
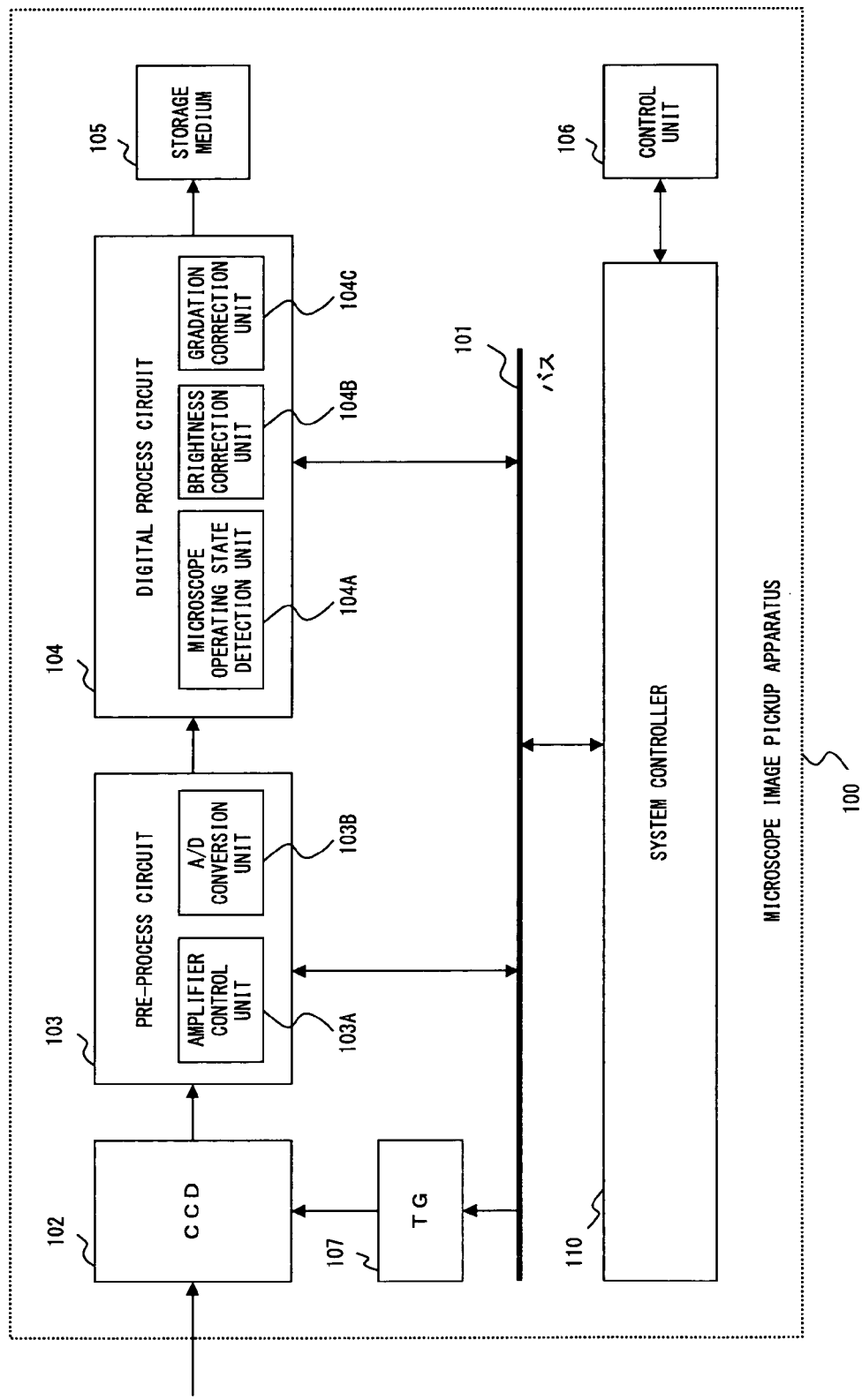
FIG. 2 shows the configuration of the microscope image pickup apparatus 100 to which the present invention is applied.

FIG. 2 shows the configuration of the microscope image pickup apparatus 100 to which the present invention is applied.

In FIG. 2, a timing generator (TG) 107 installed on the light input side of a CCD 12 controls the photosensitive time of the CCD 12. A pre-process circuit 103 and a digital process circuit 104 are installed to process image signals (electric signals) outputted from the CCD 12. The digital process circuit 104 comprises a microscope operating state detection unit 104A inside it and detects which a microscope operation part is shifting vertically or horizontally against the optical axis. A storage medium 105 is installed on the output side of the digital process circuit 104.

The system controller 110 calculates and determines an exposure condition, a display condition, a shooting condition and the like and transmits their setting values to the TG 107, the pre-process circuit 103 and the digital process circuit 104 through a bus 101.

Next, the operation of the microscope system is described with reference with FIGS. 1 and 2.

In a light visual field observation/examination method, light outputted from the transparent illumination light source 15 is reflected on a bending mirror 14 and an aperture is adjusted by a capacitor optical device unit 13. Then, the light is applied to the specimen 11. Light transmitted through the specimen 11 is passed through the object lens 10 and is expanded. One of the observed image separated by the observation tube unit 6 is applied to the eyepiece lens unit 7 and the other is applied to the CCD 102 of the image pickup apparatus 2 through the image pickup lens unit 5. In many of it, an optical path is switched over to only the eyepiece lens unit 7 side and the CCD 102 side of the image pickup apparatus 2 by an optical path switching mechanism.

In a fluorescent observation/examination method, light outputted from the scattering illumination light source 8 is divided by a fluorescent cube in the fluorescent cube unit 9, passes through the object lens 10 and is applied to the specimen 11. Weak excitation light is emitted from the specimen 11 by the applied light, passes through the object lens 10 and is expanded. Then, the light is divided by the wavelength different from the previous light division of the fluorescent cube in the fluorescent cube unit 9 and is applied to the CCD 102 of the image pickup apparatus 2.

The observation part of the specimen 11 is searched for and its image angle is also determined, by the operation of the stage XY handle. The focus of the specimen 11 is adjusted and fixed to an appropriate position by the operation of the object lens Z-axis handle 16 or the stage Z-axis handle 17. The coarse/fine-operation of the object lens Z-axis handle 16 or the stage Z-axis handle 17 can be switched by the object lens Z-axis handle coarse/fine-operation change-over switch 16-1 or the stage Z-axis handle coarse/fine-operation change-over switch 17-1 when focusing, and these switching state is reported to the microscope control unit 3 through the drive circuit unit 4.

The observed image inputted to the image pickup apparatus 2 is converted from light to electricity by the CCD 102 and its outputted electric signals are transmitted to the pre-process circuit 103. In the pre-process circuit 103, an amplifier control unit 103A adjusts its dynamic range, and an A/D conversion unit 103B converts the electric signals into digital signals and transmits them to the digital process circuit 104. The digital process circuit 104 performs its image processing, such as brightness correction, gradation correction and the like, and transmits appropriated image data to the storage medium 105 to record it.

One of the features of the above-described microscope image pickup apparatus to which the present invention is applied is to shoot the observation images of a specimen in order to observe the specimen by a microscope and to detect the operating state of the microscope operation part in order to operate the microscope. Therefore, this detection method is described as the first preferred embodiment of the present invention.

Figure 3:
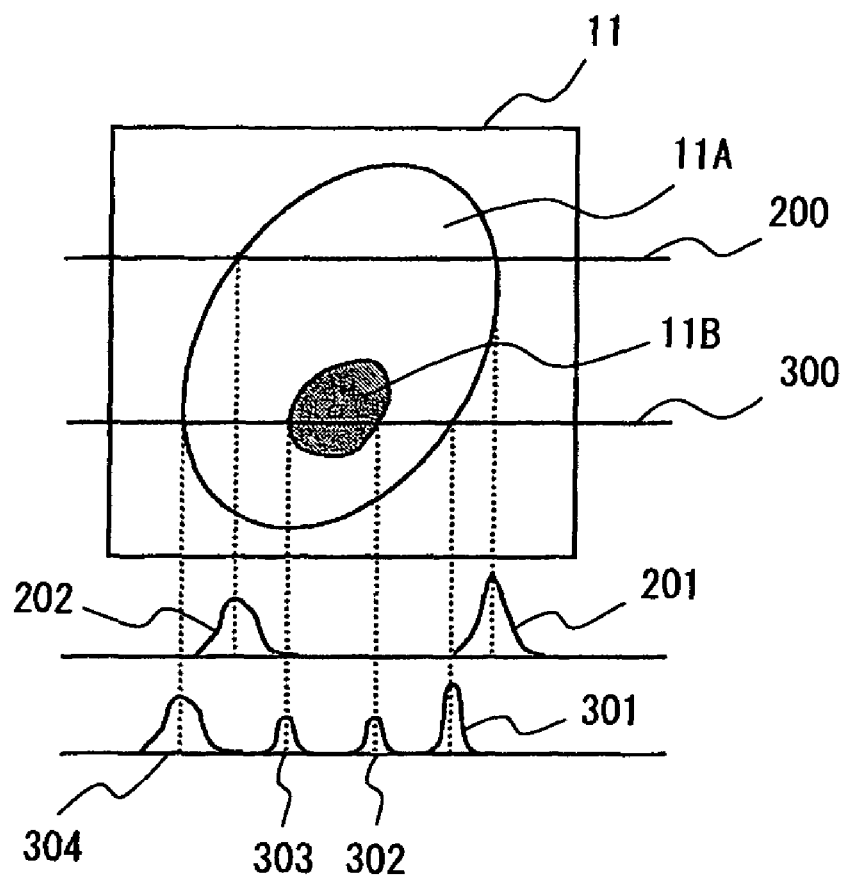
FIG. 3 shows an image display example (a state before framing or focusing) in the first preferred embodiment of the present invention.
Figure 5:
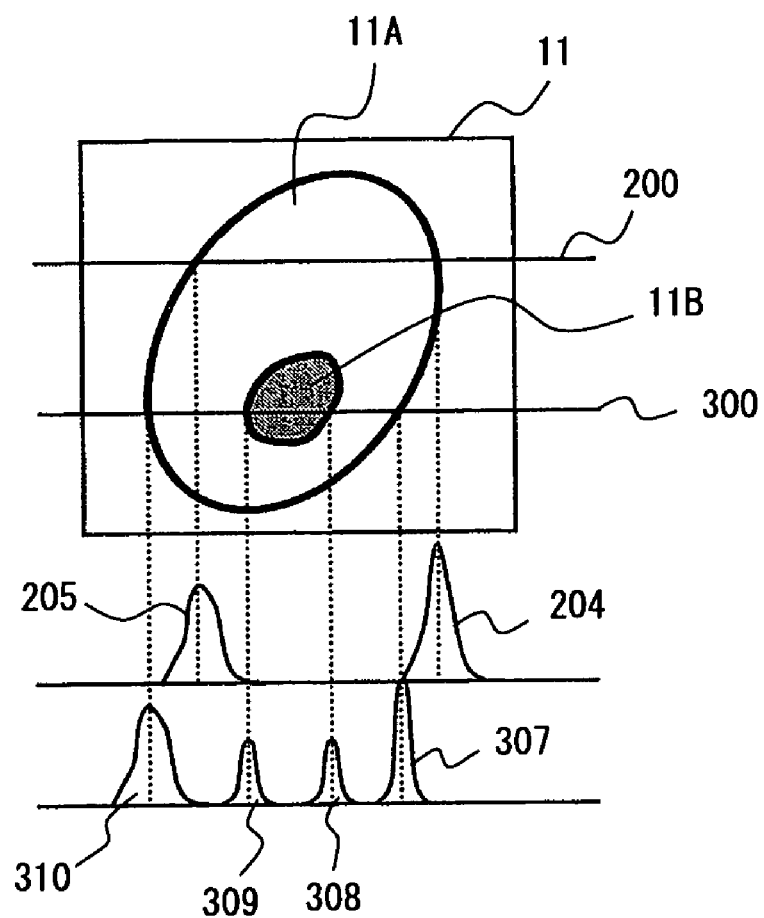
FIG. 5 shows an image display example (a state after focusing) in the first preferred embodiment of the present invention.

FIGS. 3 through 5 show the image display examples in the first preferred embodiment of the present invention. FIG. 3 shows a state before framing or focusing. FIG. 4 shows a state after framing. FIG. 5 shows a state after focusing.

The microscope operating state detection unit 104A detects the peak (maximum value) of the outline part of the partial areas 11A and 11B constituting the specimen 11 by a Laplacian operation process.

FIG. 3 shows that peaks are generated in an arbitrary horizontal pixel lines 200 and 300 of the image display example before framing or focusing by Laplacian operation. For example, in the horizontal pixel line 200, peaks 201 and 202 occur in the outline part of the partial area 11A. In the horizontal pixel line 300, peaks 301 and 304 occur in the outline part of the partial area 11A and peaks 302 and 303 occur in the outline part the partial area 11B.

When framing in such a state, the peak positions change as shown in FIG. 4. Specifically, the peaks 201, 301 and 302 shown in FIG. 3 move to the positions of the peaks 203, 305 and 306, respectively, shown in FIG. 4.

When focusing in the state shown in FIG. 3, peak strength varies as shown in FIG. 5. Specifically, the strength of the peaks 201, 202, 301, 302, 303 and 304 change to that of the peaks 204, 205, 307, 308, 309 and 310, respectively, shown in FIG. 5.

Therefore, which the operating state of the microscope operation part is, framing or focusing can be detected by paying attention to the peak (maximum point) of an arbitrary horizontal pixel line and catching the change of a peak position or peak strength.

Figure 6:
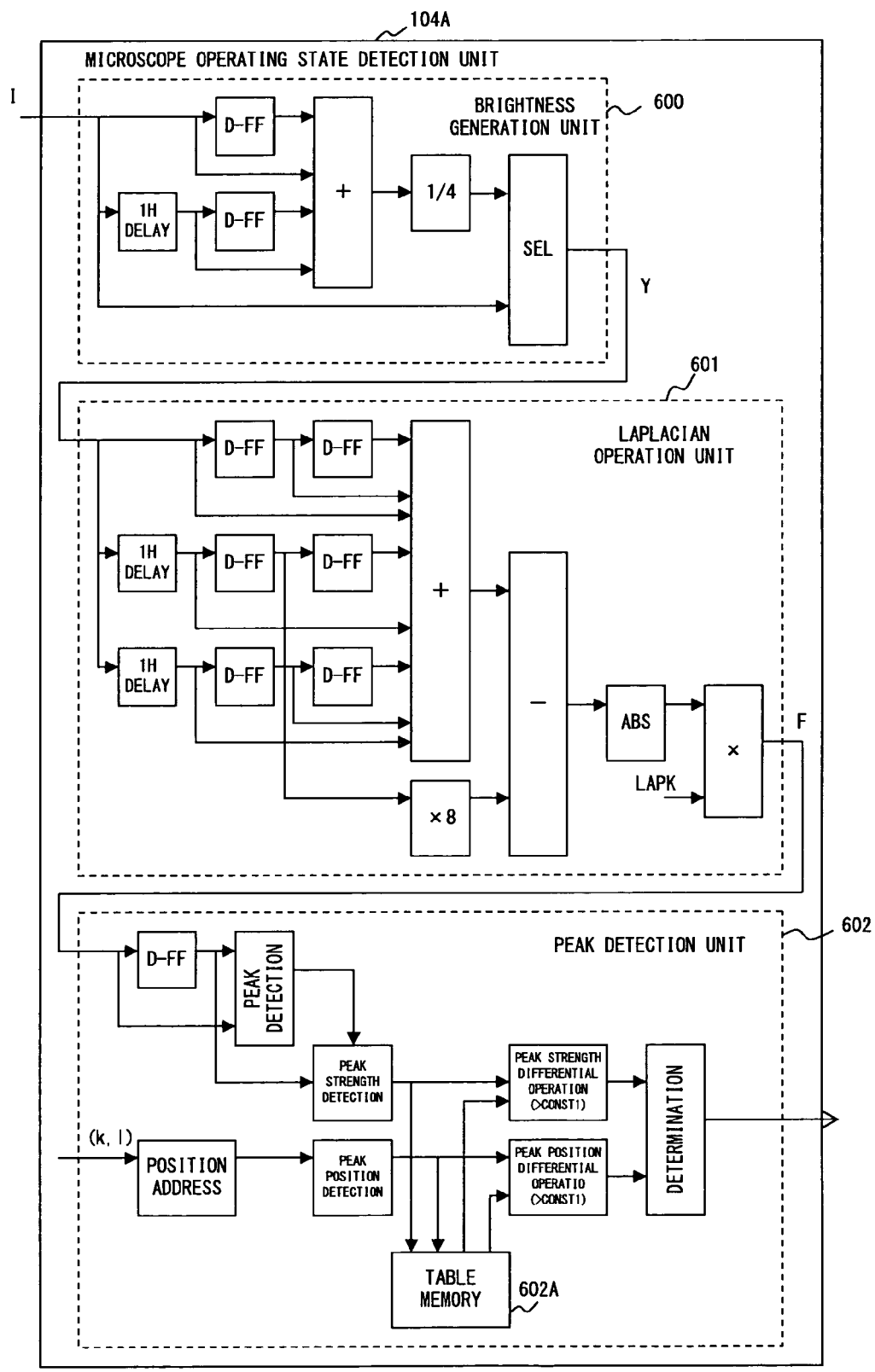
FIG. 6 shows the block configuration of a microscope operating state detection unit 104A.

FIG. 6 shows the block configuration of a microscope operating state detection unit 104A.

FIG. 7 shows the operation image of a brightness generation unit 600. FIG. 8 shows the operation image of a Laplacian operation unit 601. FIG. 9 shows a data string stored in table memory 602A.

When image data is inputted, the brightness generation unit 600 outputs a brightness value according to which the CCD 102 is for color images or black/white images to the Laplacian operation unit 601. Specifically, in the case of a color image, the brightness generation unit 600 outputs the average brightness value of four surrounding pixels to the Laplacian operation unit 601. In the case of a black/white image, it outputs the brightness value of each pixel to the Laplacian operation unit 601. More specifically, in the case of a color image, it is calculated according to the following equation (1) and in the case of a black/white image, it is calculated according to the following equation (2).

$$Y(k,l) = (Ir(i,j) + Ig(i,j+1) + Ig(i+1,j) + Ib(i+1,j+1))/4 \quad (1)$$

$$Y(k,l) = Iy(i,j) \quad (2)$$

In the above equations, I and Y represent the brightness value of each pixel and an average brightness value, respectively. i and j in (i, j) represent a horizontal coordinate and a vertical coordinate, respectively. k and l in (k, l) represent i and j after the operation process. Those k and l in (k, l) are obtained according to the following equations (3) and (4), respectively.

$$k = (2i+1)/2 \quad (3)$$

$$l = (2j+1)/2 \quad (4)$$

The Laplacian operation unit 601 Laplacian-operates a brightness value generated by the brightness generation unit 600 and outputs it to a peak operation unit 602. Specifically, operation according to the following equation (5) is performed using nine pixels including a center pixel and its eight surrounding pixels. Namely, a value obtained by multiplying the brightness value of the center pixel by eight is deducted from the addition of the brightness values of the eight surrounding pixels, its absolute value is multiplied by a Laplacian filter coefficient and its operation result is outputted to the peak operation unit 602.

$$F(Y) = LAPK \times |Y(k-1,l-1) + Y(k,l-1) + Y(k+1,l-1) + Y(k-1,l) + Y(k+1,l) + Y(k-1,l+1) + Y(k,l+1) + Y(k+1,l+1) - 8 \times Y(k,l)| \quad (5)$$

In the above equation, LAPK represents a constant for adjusting peak strength called "Laplacian filter coefficient".

The peak detection unit 602 detects the operation state of the microscope operation part from the difference in peak strength (maximum value) between a peak position (maximum coordinates) in an arbitrary horizontal pixel between the immediately preceding and succeeding frames on the basis of the operation result calculated by the Laplacian operation unit 601.

Specifically, the operation result calculated by the Laplacian operation unit 601 is stored in the table memory 602A (see FIG. 9), a plurality of peak positions (kmax(n), lmax(n)) and peak strength $Fmax_{(n)}Y$, which are obtained from an arbitrary frame, are compared with each of the preceding and succeeding frames with reference to the table memory 602A. If the peak strength is the same and the peak position is higher than a certain threshold (CONSTANT1), namely, the following equation (6) is satisfied, it is determined that it is framing. If the peak position is the same and the peak strength is larger than a certain threshold (CONSTANT2), namely, the following equation (7) is satisfied, it is determined that it is focusing.

$$((kmax(n+1) - kmax(n))^2 + (lmax(n+1) - lmax(n))^2)^{1/2} \geq CONSTANT1 \quad (6)$$

$$|Fmax_{(n+1)}(Y) - Fmax_{(n)}Y| \geq CONSTANT2 \quad (7)$$

By such a method, the operating state of the microscope operation part can be detected from image signals.

Next, the second preferred embodiment of the present invention is described with reference to the drawings.

The second preferred embodiment is based on the fact that recently there has been an interlace scanning method in which a multi-pixel CCD is a main stream as a method for reading the image signals of the CCD 102 shown in FIG. 2. In some type of the CCD 102, an interlace method is selected when reading all pixels, and a progressive scanning method is used when reading partial pixels to improve its speed.

When framing using such a CCD 102, a progressive scanning method capable of high-speed operation or a high-speed reading method is selected. When focusing, an interlace scanning method is automatically selected. As such a method, the second preferred embodiment of the present invention is described.

Figure 10:
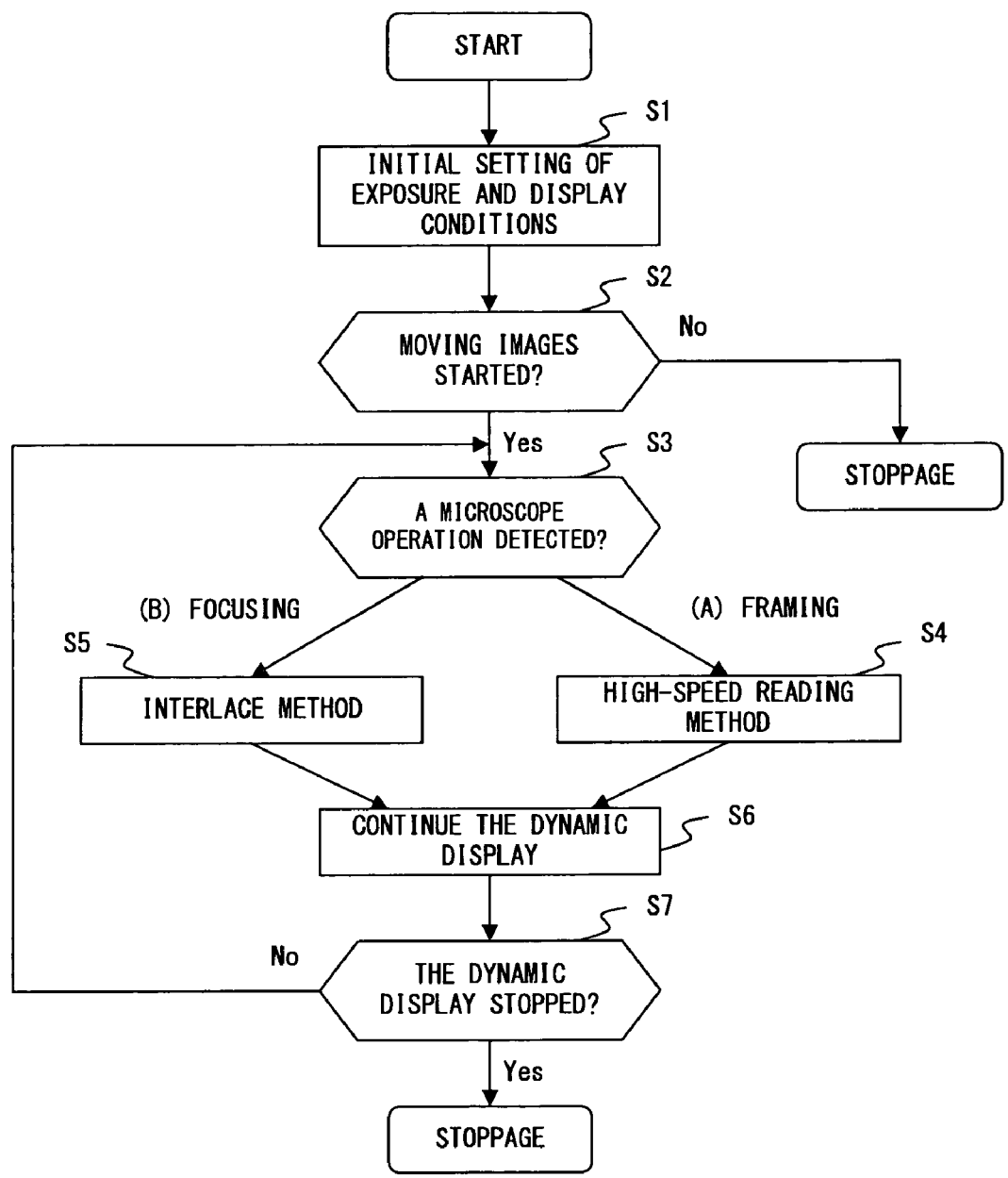
FIG. 10 is the operation flowchart of the second preferred embodiment of the present invention.

FIG. 10 is the operation flowchart of the second preferred embodiment of the present invention.

Firstly, in step S1, an exposure condition and a display condition are initially set before starting moving image display.

Then, in step S2, the start of the moving image display is set by the on/off control of the operation unit 106 to start the moving image display. Then, in step S3, the operating state of the operation unit 106 (microscope operation part) is detected by the method described above in the first preferred embodiment. If it is determined that this operating state of the microscope operation part is framing (framing (A) in step S3), in step S4 a high-speed reading method is set. If it is determined that it is focusing (focusing (B) in step S3), in step S5 an interlace scanning method is set.

Then, in step S6 the moving image display continues and in step S7 it is determined whether to stop the moving image display. If the moving image display is not stopped (No in step S7), the flow returns to step S3 to monitor the operating state of the microscope operation part again and to automatically switch the display condition (step S4 or S5) according to the operating state.

Next, the third preferred embodiment of the present invention is described.

This third preferred embodiment comprises a TG 107 for controlling an exposure time in order to control the amount of light of an observation image inputted to the CCD 102 or a brightness correction unit 104B for adjusting brightness and a system controller 110 for checking whether or not brightness is appropriate on the basis of image signals processed in the digital process circuit 104 and performing automatic exposure control (AE) for setting the exposure condition and a gain setting value again if it is inappropriate.

Figure 11:
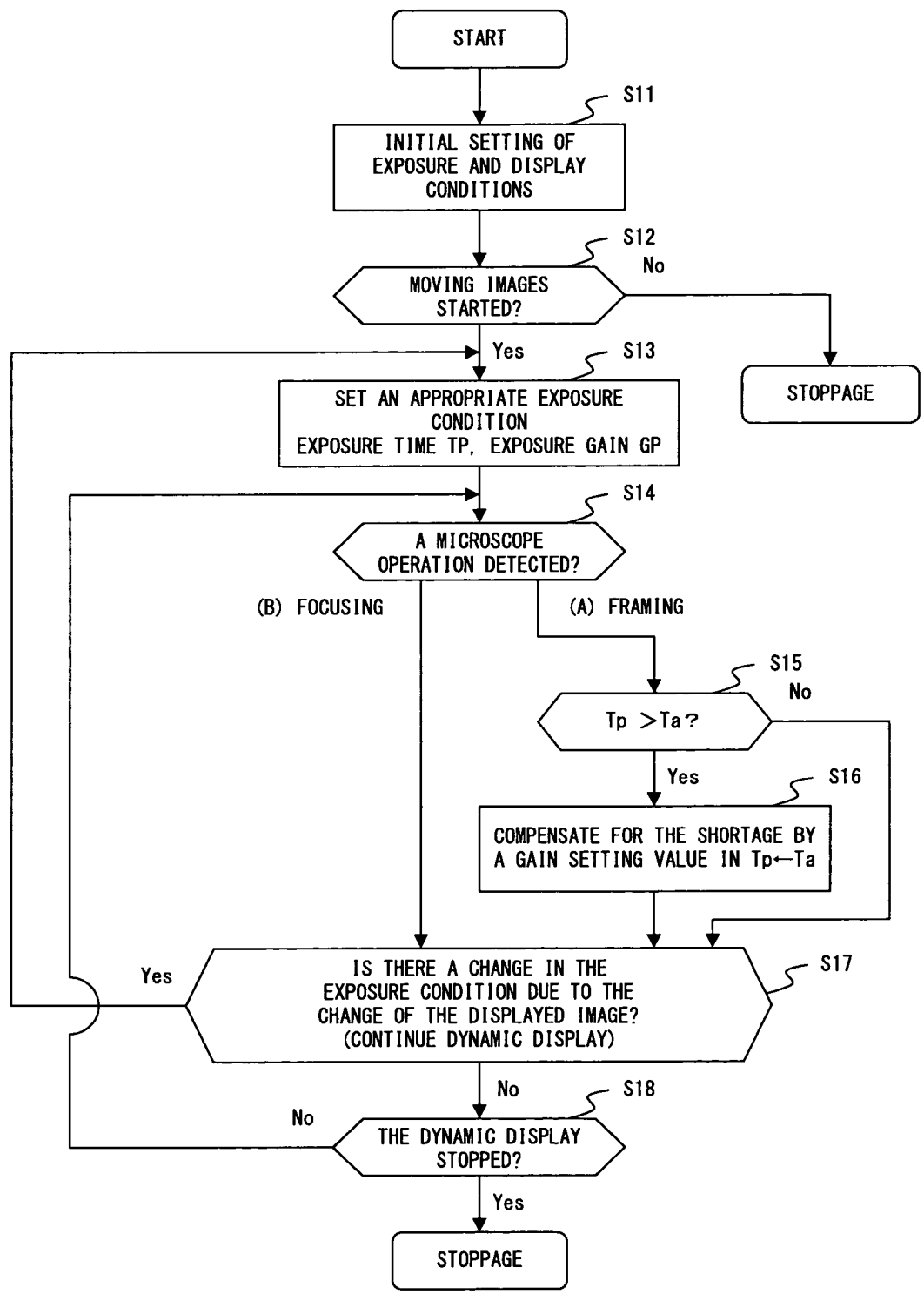
FIG. 11 is the operation flowchart of the third preferred embodiment of the present invention.

FIG. 11 is the operation flowchart of the third preferred embodiment of the present invention.

Firstly, in step S11, an exposure condition and a display condition are initially set before starting moving image display.

Then, in step S12 the start of the moving image display is set by the on/off control of the operation unit 106 to start the moving image display. Then, in step S13 an appropriate exposure condition is set while displaying a moving image. This appropriate exposure time and exposure gain setting value are assumed to be Tp and Gp, respectively.

Then, in step S14 the operating state of the microscope operation part is detected by the method described above in the first preferred embodiment. If it is determined that this operating state of the microscope operation part is framing (framing (A) in step S14), the exposure time must be shortened since it is necessary to increase a frame rate. Therefore, in step S15 it is compared with the upper limit Ta of an exposure time pre-determined on the basis of the minimum frame rate necessary for framing. If the exposure time Tp obtained in step S13 is longer than the minimum exposure time Ta (Yes in step S15), in step S16 Tp=Ta is satisfied (Ta is assigned to Tp) and the shortage in the brightness value of the image data is compensated by a gain setting value. If the exposure time Tp obtained in step S13 is shorter than the minimum exposure time Ta (No in step S15), the flow proceeds to step S17 without any modification of both the exposure time and the gain setting value.

If it is determined that this operating state of the microscope operation part is focusing (framing (B) in step S14), the flow proceeds to step S17 since there is no special need to modify the setting because of an appropriate exposure condition.

Then, in step S17 the moving image display continues and in step S7 it is determined whether the exposure condition is changed by an image change due to the operation of the microscope operation part. If there is a change (Yes in step S17), the flow returns to step S13 to calculate an appropriate exposure condition again.

If there is no change (No in step S17), in step S18 it is determined whether to stop the moving image display. If the moving image display is not stopped (No in step S18), the flow returns to step S14 to continue to detect the operating state of the microscope operation part until the moving image display stops.

Next, a variation of this third preferred embodiment is described.

In the third preferred embodiment, the operation flow is complex. Therefore, several exposure condition patterns are prepared in the microscope system and the pattern after detecting the operation state of the microscope is automatically switched. Such a variation is described.

Figure 12:
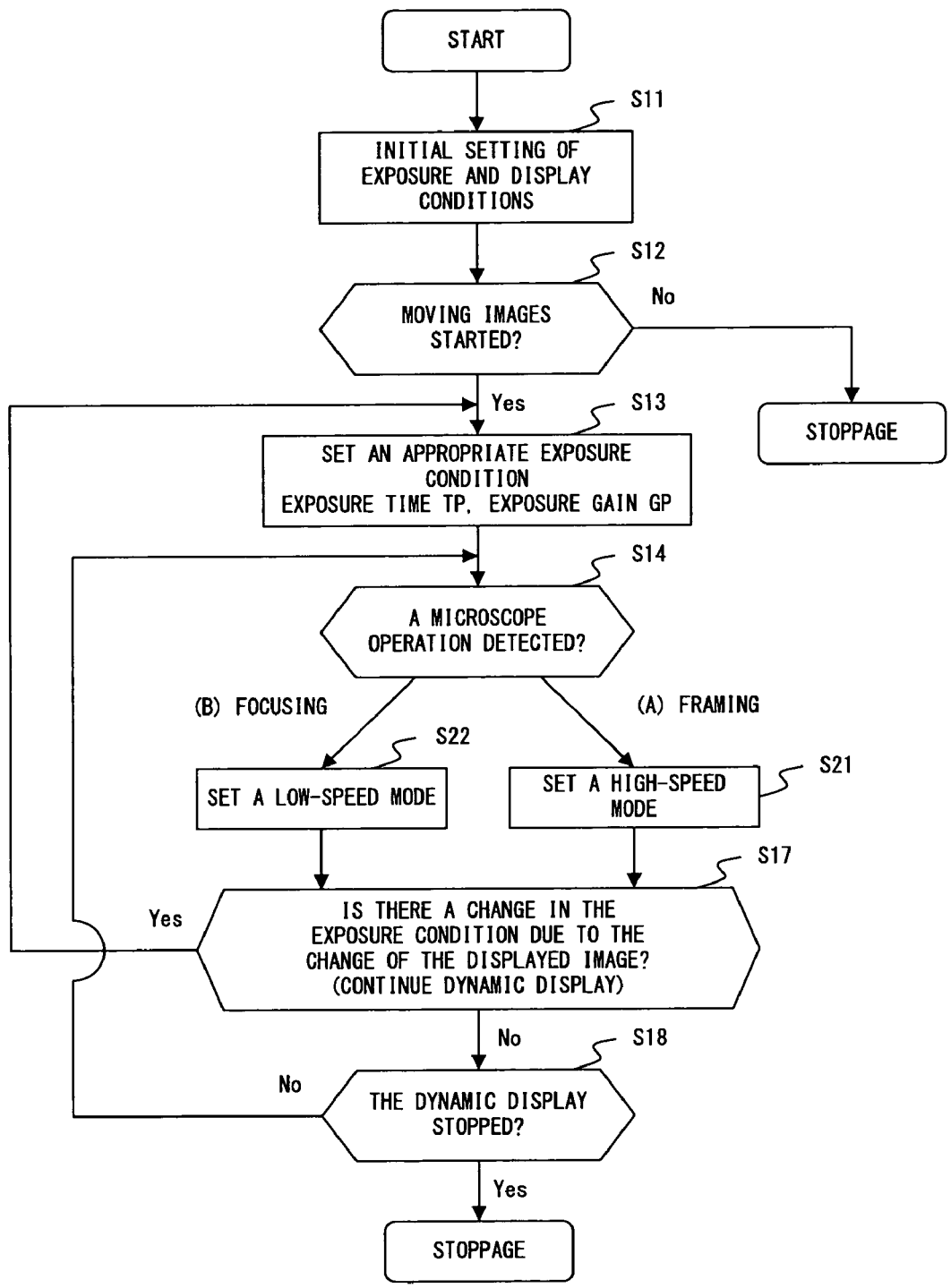
FIG. 12 is the operation flowchart of the variation of the third preferred embodiment of the present invention.

FIG. 12 is the operation flowchart of the variation of the third preferred embodiment of the present invention.

In the variation of this third preferred embodiment, a setting for increasing a frame rate by setting a gain setting value to a large value and shortening an exposure time (here called "high-speed mode") and a setting for performing AE adjustment only by an exposure time by setting the gain setting value to a small value, such as "1" time and the like (here called "low-speed mode" are prepared.

The descriptions of steps S11 through S14 and after step S17 are omitted since they are the same as those of the third preferred embodiment.

When framing is detected after detecting the operation of the microscope operation part (step S14) (framing (A) in step S14), in step S21 the high-speed mode is selected. If focusing is detected (focusing (B) in step S14), in step S22 the low-speed mode is selected.

By this method, an exposure condition corresponding to the operation state of the microscope can be easily set.

Next, the fourth preferred embodiment of the present invention is described.

This fourth preferred embodiment comprises a scattering illumination light source 8, a transparent illumination light source 15 and a driving circuit unit 4 for adjusting the of light of both the scattering illumination light source 8 and the transparent illumination light source 15.

Figure 13:
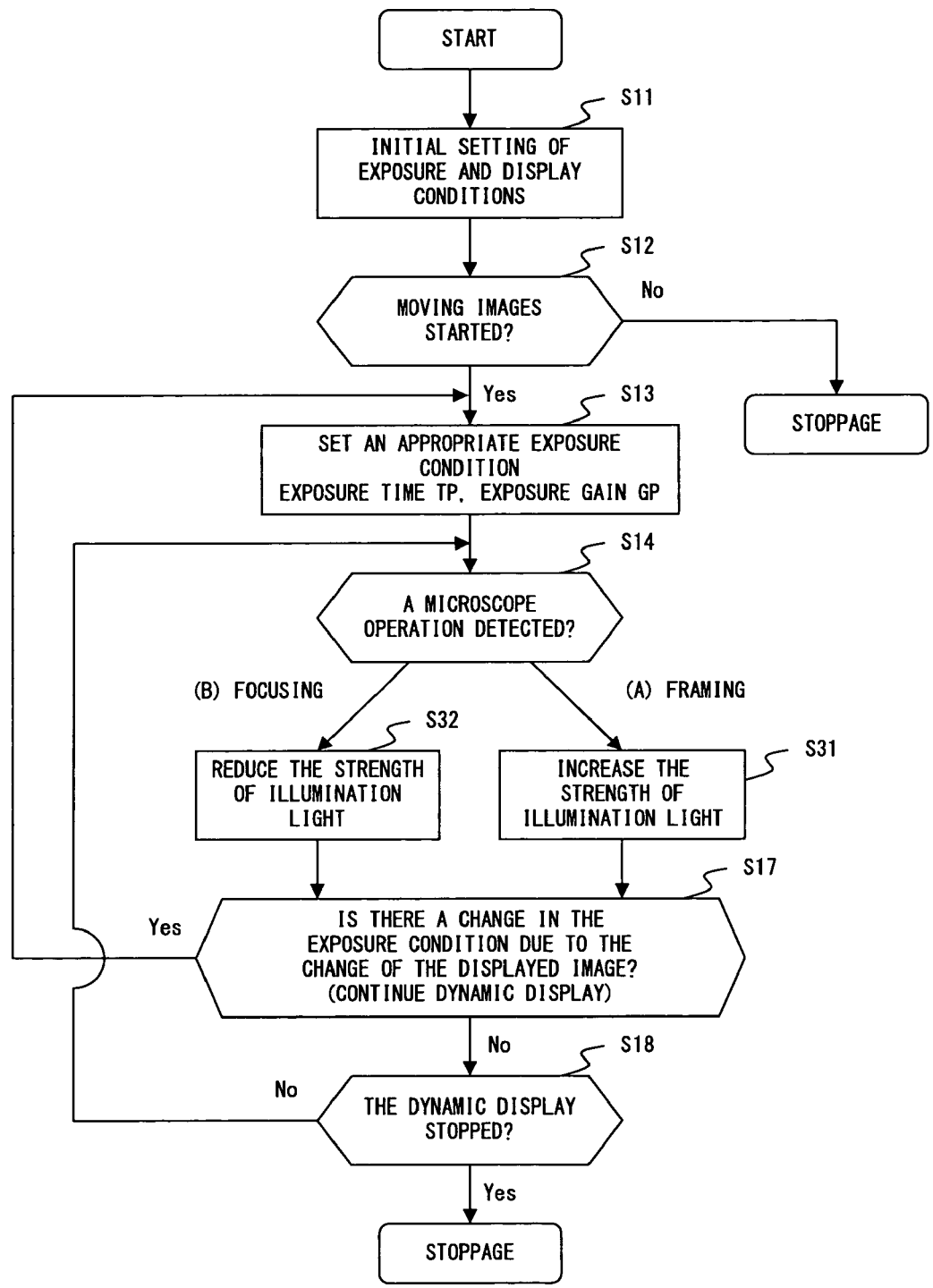
FIG. 13 is the operation flowchart of the fourth preferred embodiment of the present invention.

FIG. 13 is the operation flowchart of the fourth preferred embodiment of the present invention.

The descriptions from the initial setting of an exposure condition and a display condition (step S11) until the detection of a microscope operation (step S14) are omitted since they are the same as those shown in FIGS. 11 and 12.

If framing is detected (framing (A) in step S14) after detecting the operation state of the microscope (step S14), in step S31 the strength of illumination light is increased to light an observation image. If focusing is detected (focusing (B) in step S14), in step S32 the amount of light of illumination light is reduced.

Then, as shown in FIG. 11 or 12, the change of an exposure condition and the operating state of the microscope are monitored. If any of them is detected, the flow returns to the previous process(es) (step S13 and/or S14).

Since the brightness of an observation image is increased by increasing the strength of illumination light thus when framing, an exposure time calculated by AE control can be shortened and a frame rate can be increased.

Next, the fifth preferred embodiment of the present invention is described.

In this fifth preferred embodiment, the object lens Z-axis handle 16 and a stage Z-axis handle 17, which are shown in FIG. 1, comprise a coarse/fine-operation change-over switches 16-1 and 17-1, respectively, for switching coarse operation and fine operation.

As described above with reference to FIG. 10, in the second preferred embodiment, by setting an interlace scanning method (all pixel reading) when focusing, a high-resolution moving image can be displayed and the stage 12 and the object lens 10 can be located in the optimum position. However, in this method, since the update time of a displayed moving image is slow, follow-up capability deteriorates, which is a problem.

If the operation of focusing is finely classified, firstly, the stage Z-axis handle (or the object lens Z-axis handle 16) is shifted to the neighborhood of the optimum position by coarsely operating it, and then is set to the optimum position by finely operating it.

Figure 14:
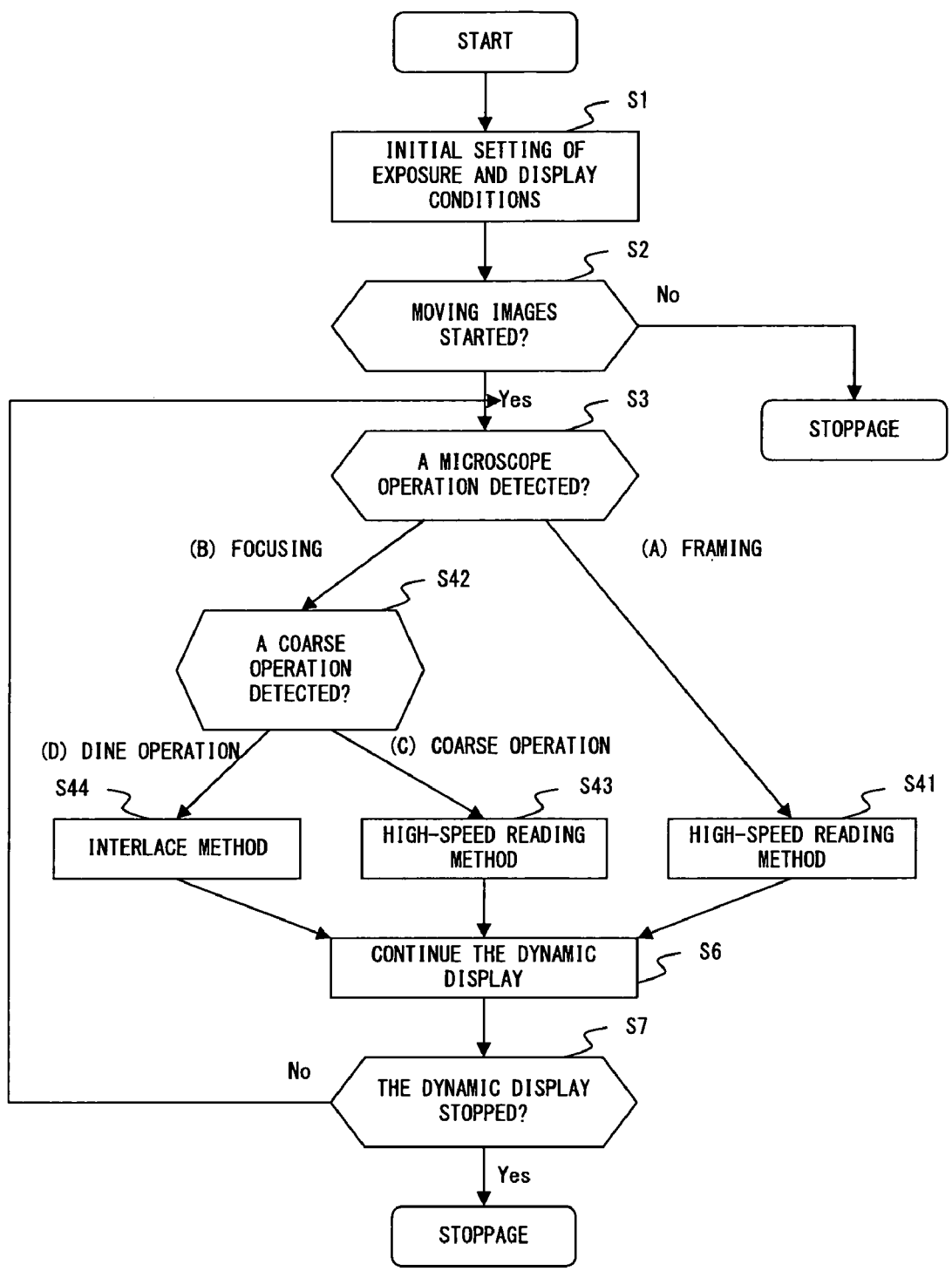
FIG. 14 is the operation flowchart of the fifth preferred embodiment of the present invention.

FIG. 14 is the operation flowchart of the fifth preferred embodiment of the present invention.

The descriptions from the initial setting of an exposure condition and a display condition (step S1) until the detection of a microscope operation (step S3) are omitted since they are the same as those shown in FIG. 10.

If framing is detected (framing (A) in step S3) after detecting the operation state of the microscope (step S3), in step S41 a high-speed reading method is set. If focusing is detected (focusing (B) in step S3), in step S42 the state of the coarse/fine-operation change-over switches 16-1 or 17-1 is detected. In this case, if coarse-operation is detected as the state of the coarse/fine-operation change-over switches 16-1 or 17-1

(coarse-operation (C) in step S42), in step S43 a high-speed reading method is set. If fine-operation is detected (fine-operation (D) in step S42), in step S44 an interlace method is set.

Then, as shown in FIG. 10, the operating state of the microscope operation part is monitored. If a change is detected, the flow returns to the previous step (step S3).

Therefore, since moving image display can be sped up while coarsely adjusting the stage Z-axis handle 17 (or the object lens Z-axis handle 16) from the beginning until the neighborhood of its optimum position when focusing, the overall adjustment time of focusing can be shortened without any deterioration of focusing accuracy.

Although each preferred embodiment of the present invention has been so far described with reference to the drawings, the microscope image pickup apparatus to which the present invention is applied is not limited to each of the above-described preferred embodiment as long as its function is executed. It can be a single device, a system or integrated device composed of a plurality of devices or a system in which the process is performed through a network, such as LAN, WAN and the like.

It can also be realized by a system composed of a CPU, memory, such as ROM and RAM, an input device, an output device, an external storage device, a medium driving device, a portable storage medium and a network connecting device. Specifically, it can be realized by providing the microscope image pickup apparatus with memory, such as ROM and RAM, recording the program code of software for realizing the each of the above-described preferred embodiment system, an external storage device and a portable storage medium and enabling the computer of the microscope image pickup apparatus to read the program code and executing it.

In this case, the program code itself read from the portable storage medium and the like realizes the new function of the present invention and the portable storage medium and the like recording the program code constitutes the present invention.

For the portable storage medium for providing a program code, a flexible disk, a hard disk, an optical disk, a magneto-optical disk, CD-ROM, CD-R, DVD-ROM, DVD-RAM a magnetic tape, a non-volatile memory card, a ROM card, various storage media recording through a network connecting device, such as electronic mail, personal computer communication, etc. (in other words, a communication line) and the like are used.

Besides by executing a program code that a computer reads on memory, the function of the above-described preferred embodiments can also be realized by enabling OS operating on the computer and the like to execute a part or all of the actual processes according to the instruction of the program code.

Furthermore, the function of the above-described preferred embodiments can also be realized by enabling a CPU and the like provided in a function extension board or unit to execute a part or all of the actual processes according to the instruction of a program code after writing the program code read from the portable storage medium or a program (data) provided by a program (data) provider on memory provided in the function extension board inserted into a computer or the function extension unit connected to the computer.

Namely, the present invention is not limited to each of the above-described preferred embodiments and can take various configurations or shapes as long as the subject matter of the present invention is not deviated.

What is claimed is:

1. A microscope image pickup apparatus which shoots observation images of a specimen under observation by a microscope, the apparatus comprising:
    an image pickup unit for shooting and forming the observation images;
    a display unit for dynamically displaying the observation images shot and formed by the image pickup unit in succession;
    an operating state detection unit for detecting an operating state of a microscope operation part in order to operate the microscope based on a change of the observation images dynamically displayed on the display unit; and
    a reading method setting unit for setting a reading method of an observation image shot and formed by the image pickup unit according to the operating state of the microscope operation part detected by the operating state detection unit.

2. The microscope image pickup apparatus according to claim 1, wherein the operating state detection unit extracts an edge of the observation image, detects that the operating state is framing when the edge is moving on a moving image display screen, and detects that the operating state is focusing when a strength of the edge is changing.

3. The microscope image pickup apparatus according to claim 1, wherein when the operating state detection unit detects that the operating state is framing, the reading method setting unit sets a high-speed reading method, and when the operating state detection unit detects that the operating state is focusing, the reading method setting unit sets an interlace method.

4. The microscope image pickup apparatus according to claim 2, further comprising a focusing operation part detection unit,
    wherein:
    when the operating state detection unit detects that the operating state is framing, the reading method setting unit sets a high-speed reading method,
    when the operating state detection unit detects that the operating state is focusing and the focusing operation part detection unit detects operation of a coarse operation part, the reading method setting unit sets a high-speed reading method, and
    when the operating state detection unit detects that the operating state is focusing and the focusing operation part detection unit detects operation of a fine operation part, the reading method setting unit sets an interlace method.

5. The microscope image pickup apparatus according to claim 1, further comprising an exposure condition setting unit for setting an exposure condition of the image pickup unit according to the operating state of the microscope operation part detected by the operating state detection unit.

6. The microscope image pickup apparatus according to claim 5, wherein when the operating state detection unit detects that the operating state is framing, the exposure condition setting unit shortens an exposure time by increasing a gain setting value, and when the operating state detection unit detects that the operating state is focusing, the exposure condition setting unit sets the exposure time to an appropriate value.

7. The microscope image pickup apparatus according to claim 1, further comprising an illumination adjustment unit for adjusting strength of illumination light applied to the specimen according to the operating state of the microscope operation part detected by the operating state detection unit.

8. The microscope image pickup apparatus according to claim 7, wherein when the operating state detection unit detects that the operating state is framing, the illumination adjustment unit increases a strength of the illumination light and when the operating state detection unit detects that the operating state is focusing, the illumination adjustment unit reduces the strength of the illumination light.

9. A non-transitory computer-readable storage medium having a program stored thereon for enabling a computer of a microscope image pickup apparatus, which shoots and forms observation images of a specimen under observation by the microscope, to perform functions comprising:
- shooting and forming the observation images;
- dynamically displaying the shot and formed observation images in succession;
- detecting an operating state of a microscope operation part in order to operate the microscope based on a change of the dynamically displayed observation images; and
- setting a reading method of a shot and formed observation image according to the detected operating state of the microscope operation part.

10. The computer-readable medium according to claim 9, wherein:
- detecting the operating state includes extracting an edge of the observation image,
- when the edge is moving on the moving image display screen, the detecting detects that the operating state is framing, and
- when a strength of the edge is changing, the detecting detects that the operating state is focusing.

11. The computer-readable medium according to claim 10, wherein when it is detected that the operating state is framing, a high-speed reading method is set, and when it is detected that the operating state is focusing, an interlace method is set.

12. The computer-readable medium according to claim 10, wherein the program enables the computer to perform a further function comprising:
- detecting one of (i) an operation of a coarse-operation part, for coarsely executing the focusing, and (ii) an operation of a fine operation part, for finely executing the focusing, wherein:
- when it is detected that the operating state is framing, a high-speed reading method is set,
- when it is detected that the operating state is focusing and the operation of the coarse operation part is detected, the high-speed reading method is set, and
- when it is detected that the operating state is focusing and the operation of the fine operation part is detected, an interlace method is set.

13. The computer-readable medium according to claim 9, wherein the program enables the computer to perform a further function comprising setting an exposure condition of said shooting and forming according to the detected operating state of the microscope operation part.

14. The computer-readable medium according to claim 13, wherein it is detected that the operating state is framing, an exposure time is shortened by increasing a gain setting value, and when it is detected that the operating state is focusing, the exposure time is set to an appropriate time.

15. The computer-readable medium according to claim 9, wherein the program enables the computer to perform a further function comprising adjusting a strength of illumination light applied to the specimen according to the detected operating state of the microscope operation part.

16. The computer-readable medium according to claim 15, wherein when it is detected that the operating state is framing, the strength of the illumination light is increased, and when it is detected that the operating state is focusing, the strength of the illumination light is reduced.

17. A microscope image pickup method for a microscope image pickup apparatus which shoots and forms observation images of a specimen in order to observe the specimen by a microscope, the method comprising:
- dynamically displaying the observation images shot and formed by an image pickup means for shooting and forming the observation images in succession;
- detecting an operating state of a microscope operation part in order to operate the microscope based on a change of the dynamically displayed observation images; and
- setting a reading method of an observation image shot and formed in said shooting and forming according to the detected operating state of the microscope operation part.

18. A microscope image pickup apparatus which shoots and forms observation images of a specimen under observation by a microscope, the apparatus comprising:
- means for shooting and forming the observation images;
- means for dynamically displaying the shot and formed observation images shot in succession;
- means for detecting an operating state of a microscope operation part in order to operate the microscope based on a change of the dynamically displayed observation images; and
- means for setting a reading method of an observation image shot according to the detected operating state of the microscope operating part.

19. A non-transitory computer-readable storage medium storing a microscope image pickup program thereon, the program enabling a microscope image pickup apparatus which shoots and forms observation images of a specimen under observation by a computer, to perform functions comprising:
- shooting and forming the observation images;
- dynamically displaying the shot and formed observation images in succession;
- detecting an operating state of a microscope operation part in order to operate the microscope based on a change of the dynamically displayed observation images; and
- setting a reading method of a shot and formed observation image according to the detected operating state of the microscope operating part.

* * * * *